No. 868,377. PATENTED OCT. 15, 1907.
J. C. WANDS.
PACKING DEVICE FOR WATER GAGES.
APPLICATION FILED FEB. 7, 1907.
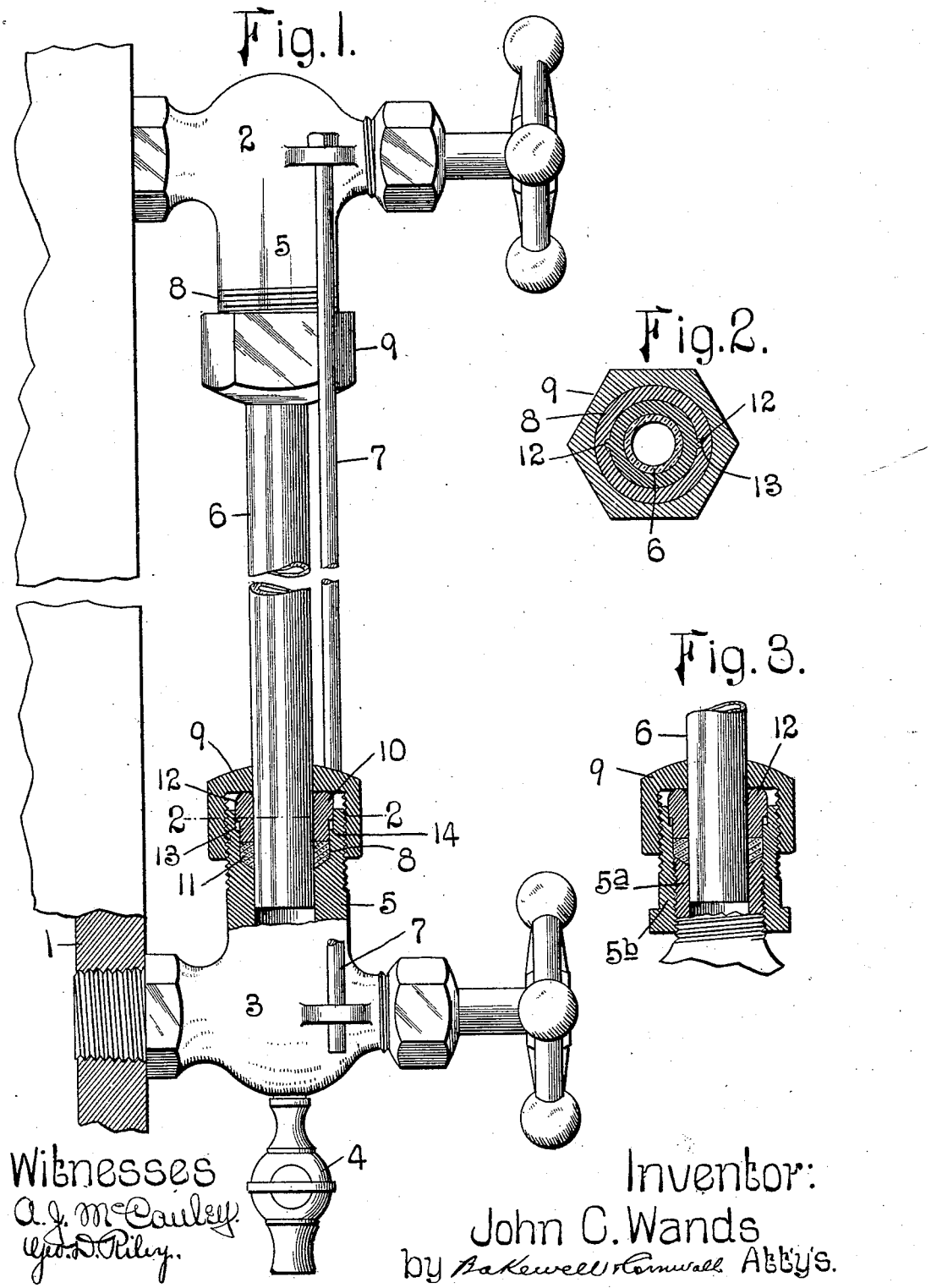
Witnesses
A. J. McCauley
Geo. D. Riley.
Inventor:
John C. Wands
by Bakewell Cornwall Atty's.

UNITED STATES PATENT OFFICE.

JOHN C. WANDS, OF ST. LOUIS, MISSOURI.

PACKING DEVICE FOR WATER-GAGES.

No. 868,377.

Specification of Letters Patent.

Patented Oct. 15, 1907.

Application filed February 7, 1907. Serial No. 356,221.

*To all whom it may concern:*

Be it known that I, JOHN C. WANDS, a citizen of the United States, residing at the city of St. Louis, State of Missouri, have invented a certain new and useful Improvement in Packing Devices for Water-Gages, of which the following is a full, clear, and exact description, such as will enable others skilled in the art to which it appertains to make and use the same, reference being had to the accompanying drawings, forming part of this specification, in which—

Figure 1 is a side elevational view, partly in section, illustrating a water gage equipped with my improved packing device; Fig. 2 is a horizontal sectional view taken on the line 2—2 of Fig. 1; and Fig. 3 is a detail sectional view illustrating my invention applied to one of the water gages in use at the present time.

This invention relates to new and useful improvements in packing devices for water gages, and is adapted for use particularly in connection with water gages wherein glass tubes are employed. Water gages of this class are provided with packing devices for maintaining a water-and steam-tight joint adjacent the ends of the glass tube. To secure the proper joint the packing device must compress the packing tightly against the glass tube and when the packing is forced home it locks said tube against rotation. The packing devices employed prior to my invention were so constructed that a rotary motion was imparted to the packing while it was being compressed against the glass tube. When the packing is forced home by these packing devices it grips the glass tube, and if said tube is packed properly at its opposite end the rotary movement of the packing will cause a torsional strain on the tube. I have found in practice that a large number of glass tubes are broken by this torsional strain.

The object of my invention is to provide an improved packing device in which the member that compresses the packing is positively locked against rotation.

Referring to Figs. 1 and 2 of the drawings, 1 indicates a wall of a steam boiler.

2 and 3 are valves communicating with the interior of the boiler, the lower valve 3 being provided with a drain cock 4. The valves 2 and 3 have tubular extensions 5, and the ends of a water glass 6 are located in these tubular extensions. Guard rods 7 are arranged in front of the water glass. The free ends of the tubular extensions 5 are counterbored to provide packing boxes 8 or chambers to receive the packing. The outside of each packing box is threaded to receive a nut 9 which coöperates with a gland 10. The upper end of the gland is preferably curved to reduce the area of contact with the nut 9, and the lower end of the gland bears upon the packing so as to compress it and thus cause it to snugly engage the water glass 6 and the inner face of the side wall of the packing box.

The gland 10 is provided with lugs or splines 12 which are preferably semi-circular in cross section, see Fig. 2, and corresponding grooves 13 are formed in the upper portion of the side walls of the packing box 8, said grooves terminating above the packing. I deem it an advantage to make the lugs 12 semi-circular because their coöperating grooves may be formed by simply drilling holes at the proper place before the tubular extension 5 is counterbored. The inner ends of the grooves 13 form a shoulder 14, and the ends of the lugs 12 engage this shoulder when the packing is forced home. When the nut 9 is turned in the proper direction the gland will move inwardly and compress the packing. The rotary movement of the nut will not rotate the packing, since the gland is locked against rotation by the lugs 12 which are located in the grooves 13.

Referring to Fig. 3, the valves on the water gages in use at the present time are usually provided with a screw-threaded extension, as shown at 5ª. When it is desired to apply my invention to one of these water gages, a sleeve 5ᵇ is screwed on the extension 5ª, the upper end of the sleeve forming the vertical walls of the packing box. The nut, gland and packing used in connection with this gage may be the same as shown in Figs. 1 and 2.

Having thus described the invention, what is claimed as new and desired to be secured by Letters Patent is:

A water gage comprising a valve casing provided with an opening to receive a glass tube, said opening communicating with a circular chamber of greater diameter than the tube, packing in the lower portion of said chamber and completely filling the space between the tube and the side wall of the chamber, a groove on the interior of the side wall of said chamber and terminating above the packing, a gland having a tubular-shaped portion which fills the space between the tube and the ungrooved portion of the wall of said chamber for bearing upon the packing to compress it and thus force it into snug engagement with the tube and the inner faces of the side wall and the bottom of the chamber, a guiding lug on the upper end of said gland that projects into the groove in the side wall of the chamber, said lug being located entirely above the tubular-shaped portion of the gland, and a nut for forcing the gland down upon the packing; substantially as described.

In testimony whereof I hereunto affix my signature in the presence of two witnesses, this second day of February 1907.

JOHN C. WANDS.

Witnesses:
F. R. CORNWALL,
GEORGE BAKEWELL.